(12) United States Patent
Sakakura

(10) Patent No.: US 9,106,066 B2
(45) Date of Patent: Aug. 11, 2015

(54) WIRE FIXING MEMBER

(71) Applicant: Sumitomo Wiring Systems, Ltd., Yokkaichi, Mie (JP)

(72) Inventor: Kouji Sakakura, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 311 days.

(21) Appl. No.: 13/709,374

(22) Filed: Dec. 10, 2012

(65) Prior Publication Data

US 2013/0168150 A1    Jul. 4, 2013

(30) Foreign Application Priority Data

Dec. 28, 2011  (JP) ................................. 2011-287569

(51) Int. Cl.

| H02G 15/02 | (2006.01) |
|---|---|
| H02G 15/08 | (2006.01) |
| H02G 3/18 | (2006.01) |
| H01R 13/52 | (2006.01) |
| H02G 3/22 | (2006.01) |
| H01R 13/58 | (2006.01) |

(52) U.S. Cl.
CPC ............. *H02G 3/22* (2013.01); *H01R 13/5205* (2013.01); *H01R 13/5808* (2013.01); *H01R 13/5202* (2013.01); *H01R 13/5825* (2013.01)

(58) Field of Classification Search
CPC ........... H01R 13/5205; H01R 13/5208; H01R 13/5221; H01R 13/5808; H01R 13/5816; H01R 13/5825
USPC .............. 174/77 R, 650, 652, 656, 658, 665; 439/274, 275, 607.23, 607.25
See application file for complete search history.

(56) References Cited

U.S. PATENT DOCUMENTS

| 4,454,381 | A | * | 6/1984 | Ito et al. ......................... 174/151 |
|---|---|---|---|---|
| 5,691,506 | A | * | 11/1997 | Miyazaki et al. ............. 174/652 |
| 6,194,661 | B1 | * | 2/2001 | Gretz .............................. 174/650 |
| 6,558,179 | B2 | * | 5/2003 | Nakamura et al. ............ 439/275 |
| 6,814,617 | B2 |  | 11/2004 | Oota et al. |
| 6,894,225 | B2 | * | 5/2005 | Koessler .......................... 174/93 |
| 7,417,189 | B2 | * | 8/2008 | Sawada ........................ 174/88 R |
| 8,648,258 | B2 | * | 2/2014 | Drouard et al. ........... 174/152 G |
| 2008/0280467 | A1 |  | 11/2008 | Tsuji |
| 2011/0300741 | A1 |  | 12/2011 | Spicer et al. |

FOREIGN PATENT DOCUMENTS

| DE | 29617655 | 12/1997 |
|---|---|---|
| JP | 2002134953 | 5/2002 |

* cited by examiner

*Primary Examiner* — Chau N Nguyen
*Assistant Examiner* — Roshn Varghese
(74) *Attorney, Agent, or Firm* — Gerald E. Hespos; Michael J. Porco; Matthew T. Hespos

(57) ABSTRACT

A wire fixing member (10) is fixed to a case in a state where wires (W) are inserted through mounting holes of the case. The wire fixing member (10) includes housings (30) through which wire insertion holes (31) allowing the insertion of the wires penetrate, rubber rings (50) that seal between the case and the housings (30), rubber plugs (40) that seal between the housings (30) and the wires (W) and metal wire crimp fittings (60) are held and retained in the housings (30) in a state where the wires (W) are fixed. A waterproof area (R) is formed on a side of the wire insertion hole (31) communicating with the interior of the case, is made waterproof by the rubber ring (50) and the rubber plug (40). The wire crimp fitting (60) is arranged in the waterproof area (R).

4 Claims, 7 Drawing Sheets

WIRE FIXING MEMBER

BACKGROUND OF THE INVENTION

1. Field of the Invention

The invention relates to a wire fixing member to be fixed to a case in a state where a wire is inserted through a mounting hole of the case.

2. Description of the Related Art

U.S. Pat. No. 6,814,617 discloses a wire fixing member to be fixed to a case in a state where wires are inserted through a mounting hole of the case. This wire fixing member includes a housing, a retaining member mounted in the housing and rubber plugs fixed to the housing. The rubber plugs are to be mounted in mounting holes of the case and form waterproof areas in the case. The retaining member is crimped and connected to the wires pulled out from the rubber plugs. A shield shell covers the housing and is fixed to the case. Thus, the wires are fixed to the case by three members, namely, the retaining member, the housing and the shield shell.

The retaining member of U.S. Pat. No. 6,814,617 could break an insulation coating of the wire if the wire is pulled. The retaining member is arranged outside the waterproof areas and hence water can enter the inside of the wire through the broken insulation coating.

The invention was completed in view of the above situation and an object thereof is to prevent fluid, such as water, from entering the inside of a wire.

SUMMARY OF THE INVENTION

The invention relates to a wire fixing member to be fixed to a case in a state where at least one wire is inserted through at least one mounting hole of the case. The wire fixing member has at least one housing. At least one wire insertion hole penetrates through the housing and can receive the wire. At least one first seal is provided to seal between the case and the housing and at least one second seal is provided to seal between the housing and the wire. A retaining member is held and retained in the housing in a state where the wire is fixed. A fluidproof area is formed on a side of the wire insertion hole that communicates with the interior of the case and is made fluidproof by the first and second seals. The retaining member is arranged at least partly in the fluidproof area.

The retaining member preferably is made of metal.

The retaining member is arranged in the waterproof area. Thus, even if an insulation coating of the wire is broken, such as because the wire is pulled strongly, water does not enter the inside of the wire.

The housing may include an accommodating portion that accommodates at least part of the second seal inside and a mounting portion that accommodates at least part of the retaining member. A partition wall at least partly partitions the accommodating portion from the mounting portion and at least one through hole may penetrate the partition wall to allow the passage of the wire. The wire insertion hole may comprise an inner space of the accommodating portion, an inner space of the mounting portion and the through hole. The housing with the seal and the retaining member mounted therein efficiently can be treated as one integral unit.

The retaining member will contact areas of the partition wall around the through hole to prevent movement of the retaining member toward the accommodating portion.

At least one front retainer may be mounted to the mounting portion for retaining the retaining member from a side of the retaining member opposite the partition wall.

At least one back retainer may be mounted to the accommodating portion for retaining the second seal from a side of the second seal opposite the partition wall.

The housing may be mounted in a shield shell made of a conductive metal and the shield shell may be fixed to the case to hold the housing in the mounting hole.

These and other objects, features and advantages of the invention will become more apparent upon reading the following detailed description of preferred embodiments and accompanying drawings.

DETAILED DESCRIPTION OF THE PREFERRED EMBODIMENTS

Figure 1:
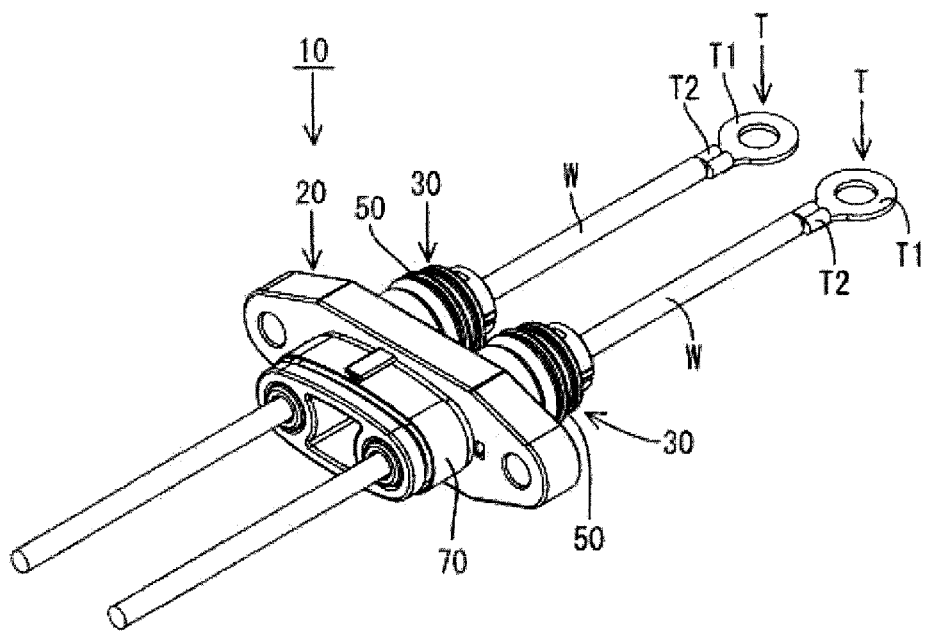
FIG. 1 is a perspective view of a wire fixing member in an embodiment when viewed from behind.

A wire fixing member according to a particular embodiment of the invention is identified by the numeral 10 in FIGS. 1 to 7. As shown in FIG. 1, the wire fixing member 10 holds wires W penetrating therethrough and is fixed to a case (not shown) for fixing the respective wires W to the case. A core is exposed at an end of each wire W by stripping an insulation coating, and a terminal fitting T is connected to the exposed core. The terminal fitting T is a round terminal and includes a round connecting portion T1 in the form of a flat plate perforated with a round hole and a wire connection portion T2 to be crimped and connected to the core.

A part of the wire W is arranged between the wire fixing member 10 and the terminal fitting T. The wire W is flexible and can take up a tolerance even if there is a large position shift with respect to a terminal block (not shown) arranged in the case. Thus, the terminal fitting T can be connected reliably to the terminal block.

Figure 2:
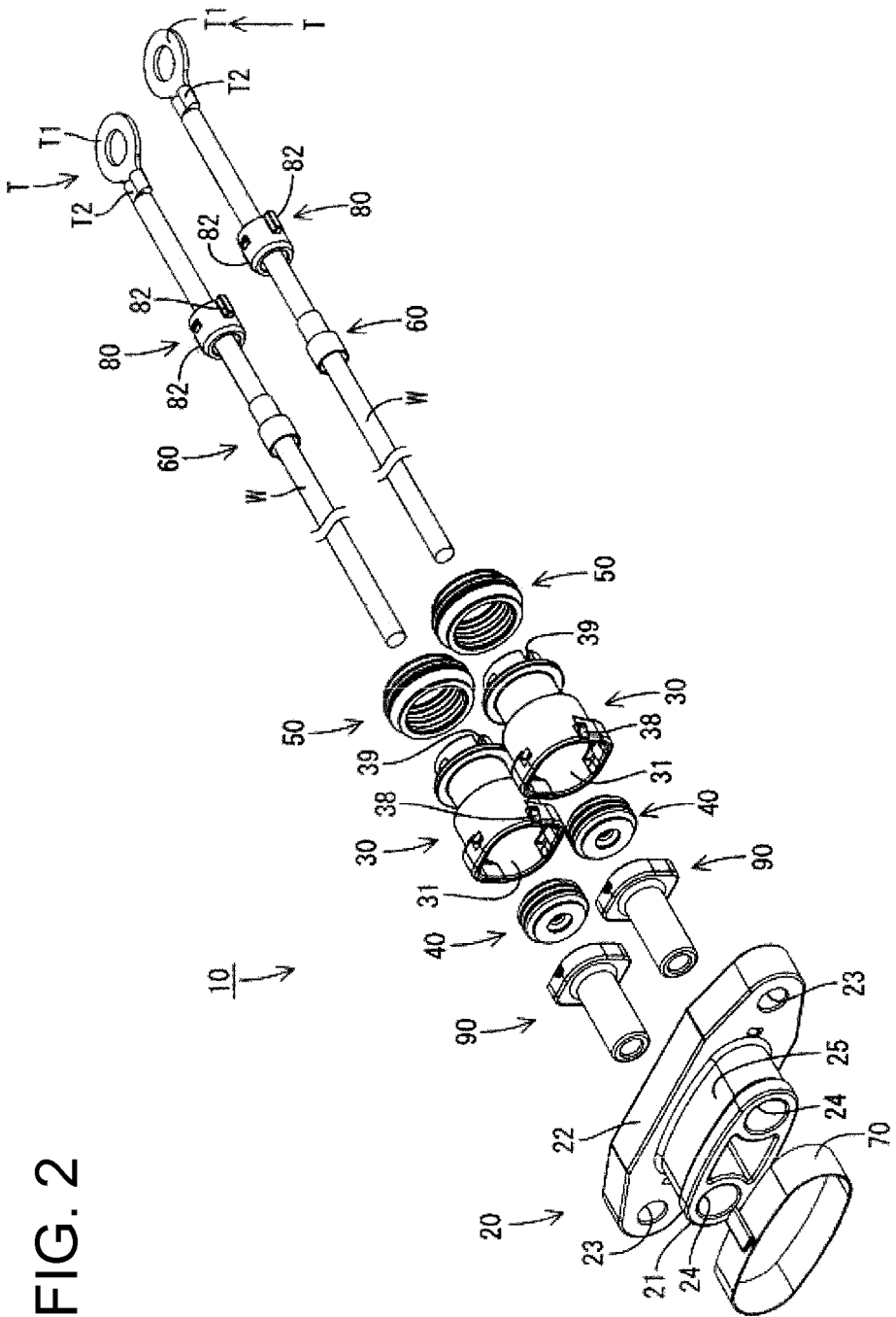
FIG. 2 is an exploded perspective view of the wire fixing member.

As shown in FIG. 2, the wire fixing member 10 includes a shield shell 20 made of a conductive material such as aluminum die-cast, housings 30 made e.g. of synthetic resin, plugs 40 made of a resilient material, rings 50 made of a resilient material such as silicone, wire crimp fittings 60 made e.g. of brass, at least one crimp band 70 made of metal, front retainers 80 made e.g. of synthetic resin and back retainers 90 made e.g. of synthetic resin.

The shield shell 20 includes a wide shell main body 21, and a mounting flange 22 is provided around the outer peripheral surface of the shell main body 21. The mounting flange 22 is arranged on the front side (side closer to the case) of the shell main body 21. Two fixing holes 23, 23 penetrate opposite widthwise sides of the mounting flange 22 in forward and backward directions. Two mounting holes 24, 24 penetrate the shell main body 21 in forward and backward directions.

Figure 3:
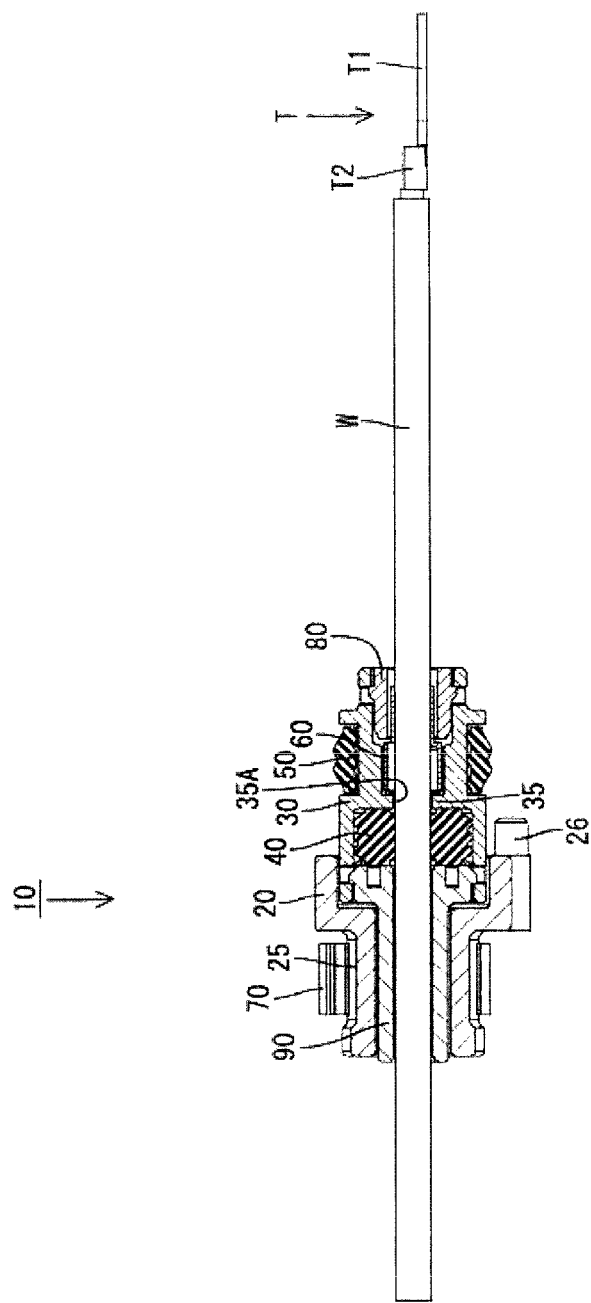
FIG. 3 is a section showing the internal structure of the wire fixing member.
Figure 4:
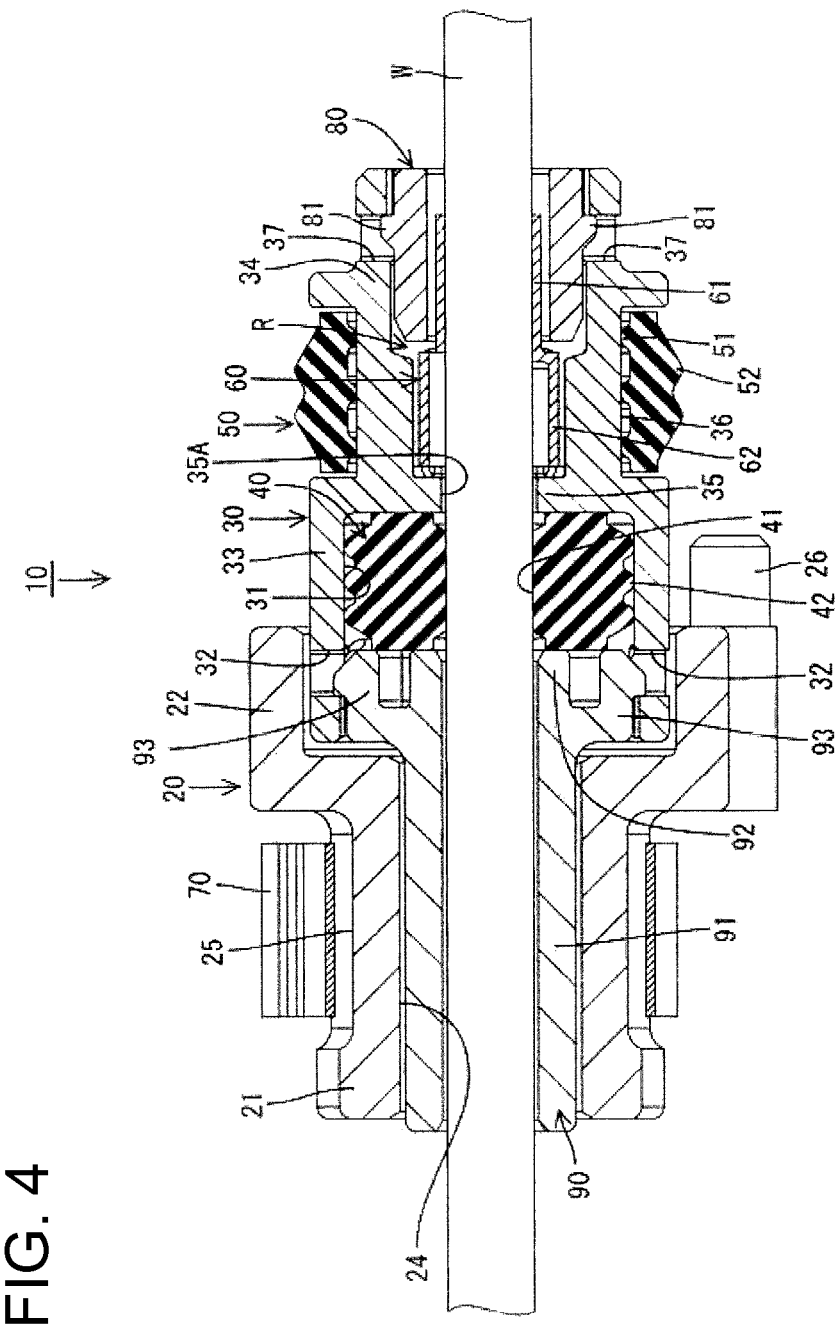
FIG. 4 is an enlarged view of an essential part of FIG. 3.
Figure 5:
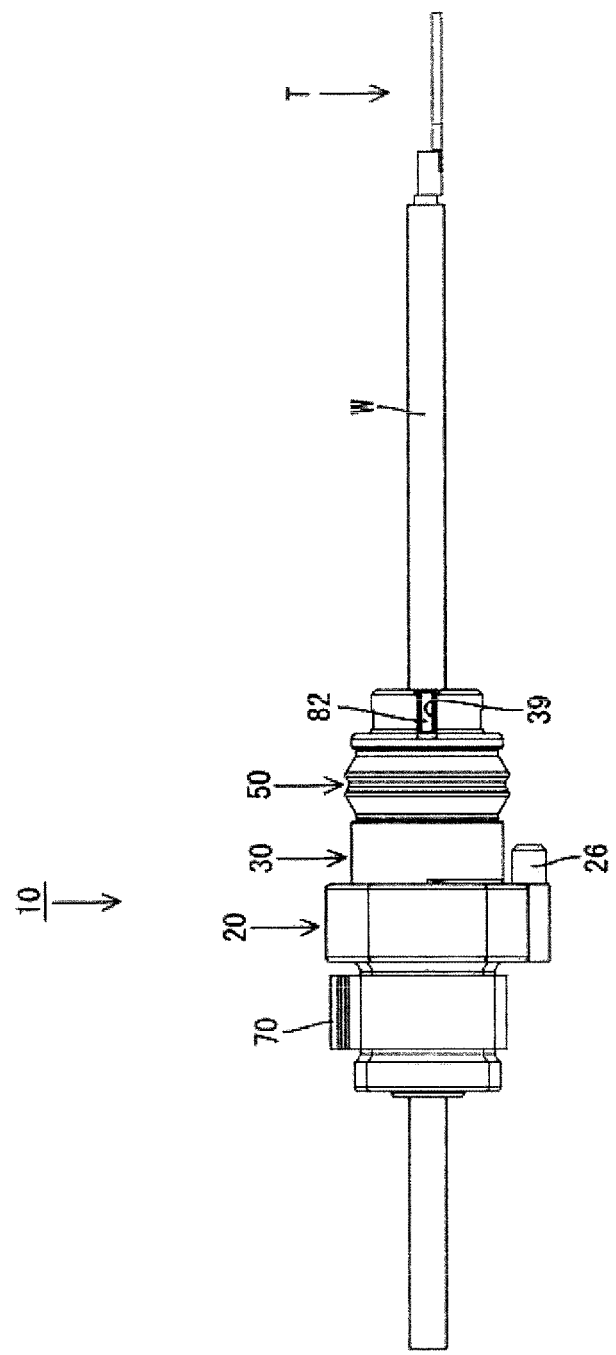
FIG. 5 is a left side view of the wire fixing member.
Figure 6:
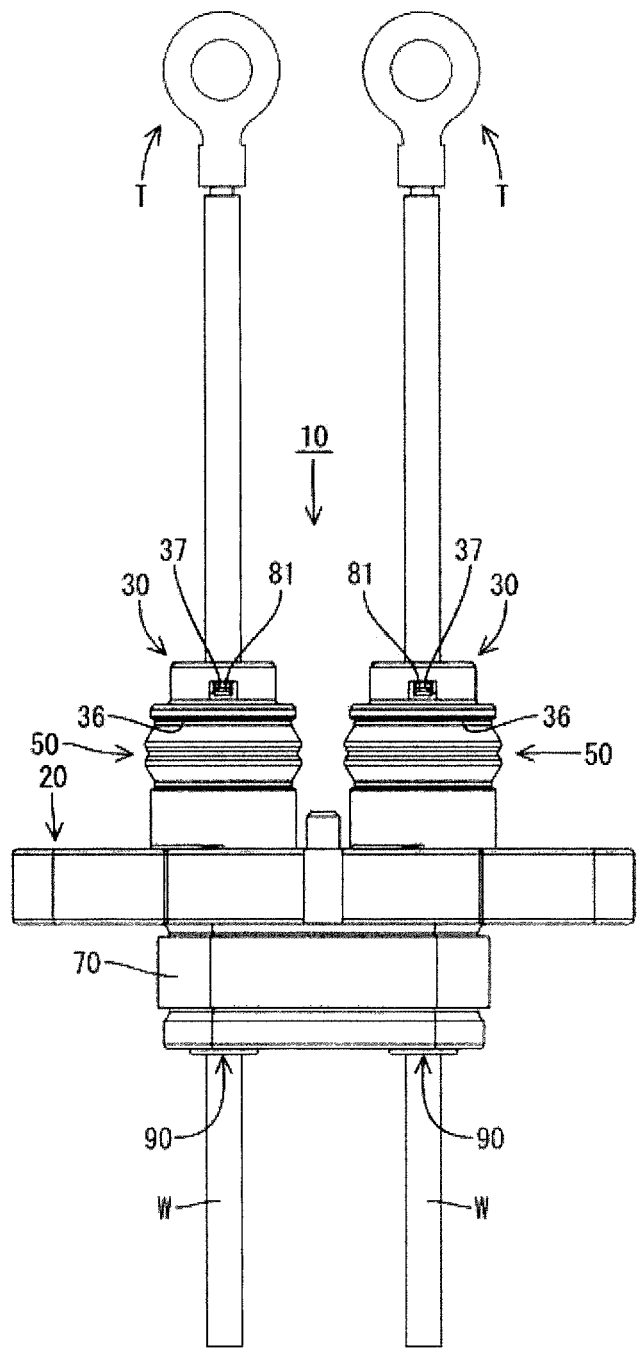
FIG. 6 is a bottom view of the wire fixing member.

As shown in FIGS. 3 and 4, each mounting hole 24 has a large-diameter part at the front side and a small-diameter part rearward of and connected to the large-diameter part. A rear part of the housing 30 and a part of the back retainer 90 in the rear part of the housing 30 are mounted in the mounting hole 24. Specifically, the back retainer 90 includes a substantially cylindrical portion 91 to be fit into the small-diameter part of the mounting hole 24 and a plug pressing portion 92 to be fit into the large-diameter part of the mounting hole 24. The plug pressing portion 92 retains the plug 40.

The plug pressing portion 92 is fit from behind into a wire insertion hole 31 that penetrates through the housing 30. The plug pressing portion 92 includes upper and lower locking pieces 93, 93 that are fit into upper and lower locking holes 32, 32 formed on a rear end part of the inner wall of the wire insertion hole 31 to be locked with respect to forward and backward directions. In this way, the plug pressing portion 92 is fit and held in the wire insertion hole 31. Note that the rear end of the cylindrical portion 91 projects slightly back from the rear end of the mounting hole 24 when the back retainer 90 is mounted in the mounting hole 24. In this way, the damage of the wire W due to a contact with a rear end opening edge part of the mounting hole 24 can be avoided.

A crimp groove 25 is formed over substantially the entire outer peripheral surface of the shell main body 21 and a shield element, such as a tubular braided wire (not shown), is placed over the crimp groove 25. A metal crimp band 70 is crimped around the shield element at the crimp groove 25 for electrically conductively securing the shield element and the shell main body 21. The shield element collectively covers the wires W so that conductive paths of the wires W are shielded collectively. Pins 26 project forward from a lower end part of the front surface of the shell main body 21 and fit into recesses in the case for positioning the shield shell 20 and preventing rotation of the shield shell 20.

Housings 30 are provided in conformity with the number of the wires W. The respective housings 30 are substantially cylindrical and can be mounted individually into the respective mounting holes 24 of the shield shell 20. Each housing 30 has an accommodating portion 33 that accommodates the plug 40 inside and a mounting portion 34 into which the wire crimp fitting 60 and the front retainer 80 are to be mounted. A partition wall 35 at least partly partitions the accommodating portion 33 from the mounting portion 34. A through hole 35A penetrates through the partition wall 35 to allow passage of the wire W. The wire insertion hole 31 extends in forward and backward directions and comprises an inner space of the accommodating portion 33, an inner space of the mounting portion 34 and the through hole 35A. Thus, the accommodating portion 33 and the mounting portion 34 communicate via the through hole 35A.

The rubber plug 40 is mounted in the accommodating portion 33. The rubber plug 40 includes an inner sealing surface 41 to be held in close contact with the outer peripheral surface of the wire W over substantially the entire circumference and outer lips 42 to be held in close contact with the inner peripheral surface of the accommodating portion 33 over substantially the entire circumference. Thus, the inner sealing surface 41 and the outer lips 42 of the rubber plug 40 prevent water or other fluid from entering into the interior of the housing 30 when the rubber plug 40 is in the accommodating portion 33. Further, the back retainer 90 retains the rubber plug 40 from behind to hold the rubber plug 40 in the accommodating portion 33. As a result, a waterproof or fluid-proof area R is formed in a space of the wire insertion hole 31 before the rubber plug 40.

The outer peripheral surface of the mounting portion 34 is recessed over substantially the entire circumference to form a mounting groove 36 for receiving the rubber ring 50. The rubber ring 50 is substantially cylindrical and has inner lips 51 that closely contact the bottom surface of the mounting groove 36 over substantially the entire circumference and outer lips 52 that closely contact substantially the entire inner peripheral surface of a mounting hole in the case. The rubber ring 50 seals the interior of the case in a fluid-tight manner when the housing 30 is fit into the mounting hole of the case. The interior of the case communicates with the waterproof area R so that the waterproof area R is held in a sealed state.

The inner space of the mounting portion 34 has a small-diameter hole facing the partition wall 35 and a large-diameter hole before and connected to the small-diameter hole. The front retainer 80 is mounted in the large-diameter hole of the mounting portion 34. Upper and lower holding holes 37, 37 are perforated in the inner peripheral surface of the large-diameter hole of the mounting portion 34 at the front end of the inner wall of the wire insertion hole 31. On the other hand, the front retainer 80 has holding projections 81, 81 that fit in the respective holding holes 37, 37 for locking with respect to forward and backward directions. Thus, when the front retainer 80 is mounted into the mounting portion 34 from front, the respective holding projections 81, 81 engage the holding holes 37, 37 to hold the front retainer 80 in the large-diameter hole of the mounting portion 34.

Rotation preventing protrusions 82, 82 are formed on left and right sides of the front retainer 80, as shown in FIG. 2. The respective rotation preventing protrusion(s) 82, 82 fit into locking grooves 39, 39 formed on left and right sides of the front opening edge of the mounting portion 34 to position the front retainer 80 in a proper posture in the large-diameter hole of the mounting portion 34 and in a rotation prevented state.

Figure 7:
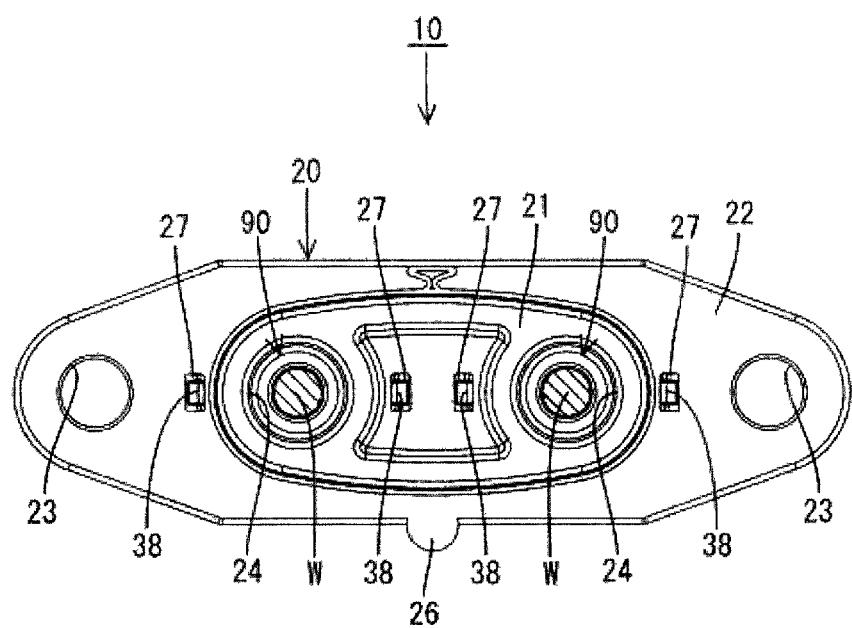
FIG. 7 is a rear view of the wire fixing member.

As shown in FIG. 2, left and right locking projections 38, 38 are formed on a rear part of the housing 30. On the other hand, engaging projections 27, 27 are formed in each mounting hole 24 of the shield shell 20, as shown in FIG. 7, and engage with the respective locking projections 38, 38 in forward and backward directions. The respective engaging projections 27, 27 are at the rear of the shield shell 20. The locking projections 38, 38 contact the respective engaging projections 27, 27 to hold the housings 30 in the respective mounting holes 24.

The wire crimp fitting 60 is to be fixed on the outer peripheral surface of the wire W. The wire crimp fitting 60 includes a substantially cylindrical crimping portion 61 to be crimped, bent or folded into connection with the wire W and a substantially cylindrical holding tube 62 behind and connected to the crimping portion 61. The holding tube 62 is slightly larger than the crimping portion 61. Only a part of the crimping portion 61 is connected to the holding tube 62 so as not to deform the holding tube 62 when crimping and connecting the crimping portion 61 to the wire W. The crimping portion 61 is a closed barrel and is connected to the wire W by hexagonal crimping. The crimping portion 61 and the holding tube 62 are substantially coaxial when the crimping portion 61 is crimped and connected to the wire W.

The crimping portion 61 that has been crimped and connected to the wire W is sized to fit in the cylindrical front retainer 80, as shown in FIG. 4. On the other hand, the holding tube 62 is sized to fit in the small-diameter hole of the mounting portion 34. The holding tube 62 contacts a peripheral edge of the through hole 35A of the partition wall 35 from the front while contacting a rear end part of the front retainer 80 from behind. In other words, the holding tube 62 is held in the small-diameter hole of the mounting portion 34 between the partition wall 35 and the rear end part of the front retainer 80.

The small-diameter hole of the mounting portion 34 is a part of the fluid- or waterproof area R. Thus, the crimping portion 61 crimped and connected to the wire W is arranged in the waterproof area R. Similarly, the large-diameter hole of the mounting portion 34 is a part of the waterproof area R so that the holding tube 62 is arranged in the waterproof area R. Accordingly, the entire wire crimp fitting 60 is arranged in the waterproof area R. Accordingly, even if the insulation coating is broken because, for example, the wire W is pulled strongly, fluid such as water does not enter the inside of the wire W through the broken insulation coating.

The wires W are inserted through the front retainers 80, the wire crimp fittings 60, the rubber rings 50, the housings 30, the rubber plugs 40, the back retainers 90, the shield shell 20 and the crimp band 70 in this order beforehand, as shown in FIG. 2. The insulation coatings are stripped at the ends of the wires W to expose the cores, and the terminal fittings T are crimped into connection with the cores. Subsequently, the crimping portions 61 of the wire crimp fittings 60 are crimped and connected to the outer peripheral surfaces of the wires W.

Before or after this crimping operation, the rubber rings 50 are fit into the mounting grooves 36 of the housings 30 and the rubber plugs 40 are accommodated into the accommodating portions 33 of the housings 30. The back retainers 90 are mounted into the accommodating portions 33 of the housings 30 from behind and the front retainers 80 are mounted into the mounting portions 34 of the housings 30 from the front. In this way, the wires W are fixed to the housings 30 and the wire crimp fittings 60 are arranged in the fluid- or waterproof areas R.

The housings 30 are mounted into the respective mounting holes 24 of the shield shell 20. The braided wire or other shield element (not shown) then is placed on the outer peripheral surface of the shell main body 21 of the shield shell 20 and the crimp band 70 is crimped to connect the braided wire to the shell main body 21. In this way, the wire fixing member 10 is completed. The mounting portions 34 of the housings 30 are fit into the mounting holes of the case and bolts are inserted into the fixing holes 23 of the mounting flange 22 and screwed into screw holes of the case to fix the shield shell 20 to the case. In this way, the wires W are inserted into the mounting holes of the case and fixed to the case by both the wire fixing member 10 and the shield shell 20.

As described above, the wire crimp fitting 60 that is crimped and connected to the wire W is arranged in the fluid- or waterproof area R. Thus, even if the insulation coating is broken, such as because the wire W is pulled strongly, fluid such as water does not enter the inside of the wire W through the broken insulation coating. Further, the shield shell 20, the housings 30, the rubber plugs 40, the rubber rings 50, the wire crimp fittings 60, the crimp band 70, the front retainers 80 and the back retainers 90 are united as the wire fixing member 10 and can be treated as one unit.

The invention is not limited to the above described embodiment. For example, the following embodiments also are included in the scope of the invention.

The wire crimp fitting 60 is fixed to the housing 30 by the front retainer 80 in the above embodiment. However, a housing may be formed by insert molding using the wire crimp fitting 60 as an insert. In such a case, a waterproofing adhesive or the like may be present on an interface between the wire W and the molding resin.

The wire W having a sufficient length is ensured between the wire fixing member 10 and the terminal fitting T in the above embodiment. However, the terminal fitting T may be accommodated into the wire fixing member according to the invention. Specifically, the invention may be applied to a shield connector including terminal fittings T and a wire fixing member.

Although the wires in which the cores are covered by the insulation coatings are illustrated in the above embodiment, the invention may also be applied to other types of wires such as coaxial cables.

The shield shell 20 is fixed to the case in the above embodiment. However, a metal collar may be press-fit into the housing or may be used as an insert in insert-molding the housing, and the housing may be fixed to the case via this metal collar.

What is claimed is:

1. A wire fixing member, comprising:
at least one housing having opposite front and rear ends, an accommodating portion at the rear end of the housing, a mounting portion at the front end of the housing and a partition wall between the accommodating portion and the mounting portion, at least one wire insertion hole penetrating through the housing from the front end to the rear end, portions of the wire insertion hole that pass through the partition wall being cross-sectionally smaller than portions of the wire insertion hole in the accommodating portion and in the mounting portion;
a wire extending through the wire insertion hole;
at least one first seal surrounding an outer surface of the mounting portion of the housing;
at least one second seal in the accommodating portion of the housing adjacent the partition wall and providing sealing between the housing and the wire;
a retaining member having a crimp fitting fixed to the wire and a holding tube that is cross-sectionally larger than the crimp fitting, the holding tube being disposed rearward of the crimp fitting and in the mounting portion adjacent the partition wall;
at least one front retainer mounted in the mounting portion, telescoped over the crimp fitting and engaging a front end of the holding tube for retaining the retaining member from a side of the retaining member opposite the partition wall; and
at least one back retainer mounted in the accommodating portion for retaining the second seal from a side of the second seal opposite the partition wall.

2. The wire fixing member of claim 1, wherein the retaining member contacts the partition wall to prevent movement of the retaining member toward the accommodating portion.

3. The wire fixing member of claim 1, further comprising a shield shell made of conductive material and into which the housing is mounted.

4. The wire fixing member of claim 1, wherein the retaining member is made of metal.

* * * * *